United States Patent [19]

Epstein et al.

[11] Patent Number: 4,574,472
[45] Date of Patent: Mar. 11, 1986

[54] METHOD AND APPARATUS FOR INSERTING ELECTRODES INTO THE CONTAINER OF AN ELECTROCHEMICAL CELL

[75] Inventors: James Epstein, Sharon; Nikola Marincic, Winchester, both of Mass.

[73] Assignee: Battery Engineering, Inc., Hyde Park, Mass.

[21] Appl. No.: 71,882

[22] Filed: Sep. 4, 1979

[51] Int. Cl.⁴ ............................................. H01M 2/06
[52] U.S. Cl. ....................................... 29/623.1; 29/730
[58] Field of Search ................... 29/623.1, 730, 731; 53/120, 429; 93/36.01; 429/167–169; 493/93–103

[56] References Cited

U.S. PATENT DOCUMENTS

| | | | |
|---|---|---|---|
| 2,402,784 | 6/1946 | Smithback | 429/167 |
| 2,428,098 | 9/1947 | Schmidt | 93/36.01 |
| 2,871,773 | 2/1959 | Verrinder | 93/36.01 |
| 2,876,272 | 3/1959 | Bence et al. | 429/169 |
| 2,962,844 | 12/1960 | Orlando et al. | 93/36.01 |
| 3,118,350 | 1/1964 | Carmichael et al. | 93/36.01 |
| 3,450,291 | 6/1969 | Lovell | 493/93 |
| 3,729,892 | 5/1973 | Aslund et al. | 53/429 |
| 4,077,183 | 3/1978 | von Philipp | 53/120 |

FOREIGN PATENT DOCUMENTS

| | | | |
|---|---|---|---|
| 1073165 | 1/1960 | Fed. Rep. of Germany | 493/93 |
| 722221 | 3/1932 | France | 493/93 |
| 29366 | 8/1974 | Japan | 429/169 |
| 133758 | 11/1951 | Sweden | 493/93 |
| 375898 | 7/1932 | United Kingdom | 429/166 |

Primary Examiner—Daniel C. Crane
Attorney, Agent, or Firm—Pahl, Lorusso & Loud

[57] ABSTRACT

A strip of electrode material is extended across a through-hole in a supporting surface and pushed through the hole into a container of an electrochemical cell. The strip assumes a generally U-shaped appearance as it is pushed through the hole by a mandril. The mandril preferably includes an elastomeric head which expands radially outward upon pressing contact with the interior base wall of the container so as to press the trailing legs of the U-shaped material outward against the interior container wall.

18 Claims, 2 Drawing Figures

U.S. Patent    Mar. 11, 1986    4,574,472
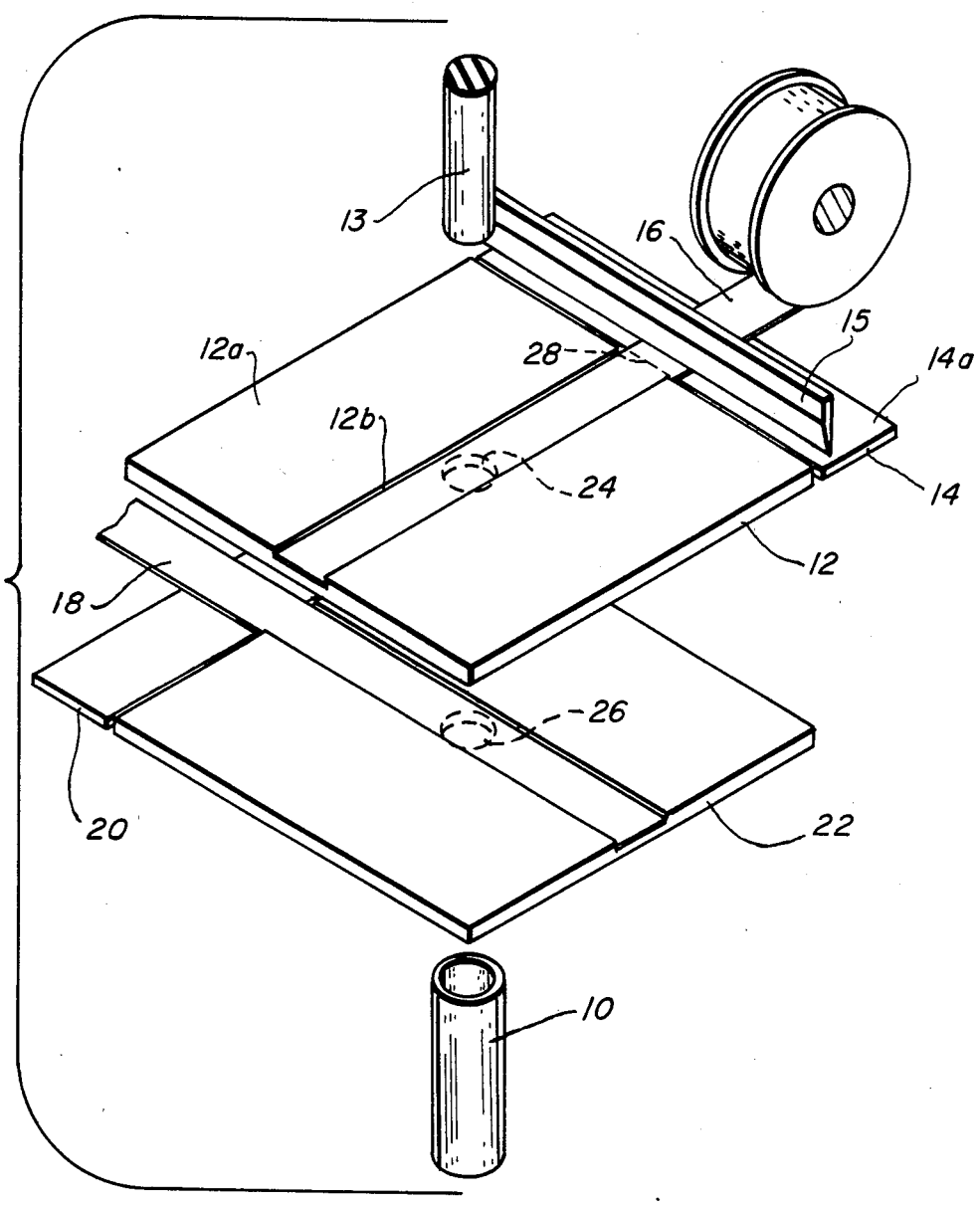
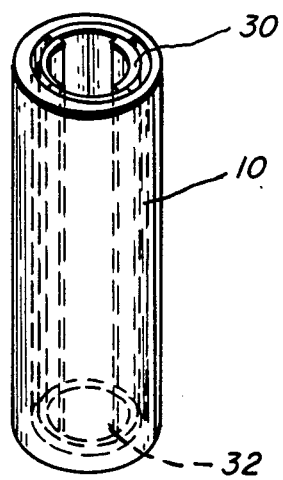

METHOD AND APPARATUS FOR INSERTING ELECTRODES INTO THE CONTAINER OF AN ELECTROCHEMICAL CELL

This invention relates to electrochemical cells and, more particularly, to a method and apparatus adapted for inserting electrodes and an interjacent electrically insulating separator into the cell container.

The cell container will be described herein as "generally cylindrical". As will become evident, however, the term will be one of convenience, rather than limitation. By this term, we will conote a cell which is disposed about a central axis; accordingly, the container may be oval, polygonical, etc.

The method disclosed herein is particularly suited for metal foil electrodes such as those formed from lithium metal, although other materials may be found suitable in the future. Accordingly, those skilled in the art will recognize that the method disclosed herein is not necessarily limited to metal foil but may be used with any mallable material which is compatible with the particular electrochemical system employed.

The prior method of inserting comparable cell components can best be described with reference to a particular cell such as a cylindrical cell having a lithium metal anode. In the construction of this type of cell, the conventional method first involved the blanking of a disc and the cutting of a rectangular-shaped piece of foil. The disc was placed in the bottom of the cell container while the rectangle was wound around a mandrel to form a cylinder. This cylinder was inserted into the can until it touched bottom. Force was then applied to the wall of this cylinder so that intimate contact was made with the container wall.

A similar procedure was used to insert the separator material, except that not force was applied after the material was in place.

A major disadvantage of this method is that two differently-shaped pieces are required.

In practice, we found that insertion of the anode, including cutting, takes seven steps to complete, while separator placement requires five.

We also found that blanking of lithium metal and separator material discs results in waste.

An object of this invention is to overcome these limitations and to provide a less expensive, easier method.

In essence, we have invented a method for inserting electrode material into the container of an electrochemical cell which comprises the steps of forming a strip of electrode material into a generally U-shaped structure, inserting the U-shaped structure, base first, into the open end of the cell container so that the leading base of the "U" contacts the interior base wall of the container. The bases of the "U" and container are pressed into contact and the legs of the "U" are spread into contact with respective adjacent walls of the container interior.

The apparatus we have employed to produce cells in accordance with the method also forms part of our invention and generally comprises a first member having a through-hole, means for supporting a strip of electrode material across the through-hole, means for pushing the strip through the through-hole so that the overlying portion of the strip precedes the strip segments remote from the hole, and means for supporting a container to receive the generally "U" shaped material which emerges from the hole.

Throughout the remaining portion of the specification, the process and apparatus will be described with reference to a lithium cell; i.e. one which uses a lithium metal anode. In addition, the particular cell described will be the type comprising a cylindrical container. It should be noted, however, that the invention is not limited to the assembly of cylindrical lithium cells and that cells of other shapes and of other electrochemical materials may be assembled by modifying the preferred embodiment of our invention which is hereinafter described with reference to the following Figures.

BRIEF DESCRIPTION OF THE DRAWING

FIG. 1 is a perspective view of apparatus adapted to the inventive process; and

FIG. 2 is an elevation view of a partially assembled cell constructed in accordance with the invention.

DETAILED DESCRIPTION OF THE PREFERRED EMBODIMENT

Turning to FIG. 1, a strip of lithium metal foil having a predetermined width is supported by the surfaces 12a, 14a of an upper guide plate 12 and a bed blade 14 respectively. The guide plate 12 includes a groove 12b which accomodates the lithium strip. The groove 12b has a predetermined length which is approximately equivalent to $2H+D$, where H and D are the height and diameter of a cylindrical container 10 that will serve as the cell container.

A lower bed blade 20 and guide plate 22 of similar description is located below the upper bed blade 14 and guide plate 12 and oriented so that a similar strip 18 of lithium foil extends perpendicular to the direction of the strip 16.

Both guide plates 12, 22 possess generally centrally located through-holes 24, 26 in their respective channels. The through-holes are generally co-axial and have diameters generally equivalent to that of the container 10. As shown in FIG. 1, the strip 16 overlies the hole 24. Similarly, the lower strip 18 overlies the hole 26.

The container 10 is generally cylindrical, open-ended at its top, and is located in general axial alignment with the holes 24, 26.

After the predetermined lengths of material are metered out by means of the predetermined channel lengths or otherwise, an upper cutting blade 15, as well as a lower cutting blade not shown, are activated. The strip 16 is accordingly cut at 28.

Sequentially or simultaneously therewith, a mandrel 13 in general axial alignment with the holes 24, 26 and container 10, and having a diameter approximately equal to that of the container, advances axially to contact the strip 16 and push it through the hole 24. The mandrel 13 continues to advance into engagement with the lower strip 18 and pushes the upper strip 16 and lower strip 18 through the lower hole 26 into the container 10.

The movement of the mandrel 13 is stopped by the interior base wall of the container 10. It will be appreciated that the leading portions of the strips 16, 18, which initially overlay the holes 24, 26, will have been pressed against, and will have conformed to, the base wall at that point. The trailing portions of the strips 16, 18 which initially extended away from the peripheries of the holes 24, 26, will have been deformed by the walls of the holes during their passage therethrough. Specifically, a generally concave shape approximating the holes' circumferential curvature will have been imparted to the trailing portions of the strips which now extend generally upward from the base of the container 10 along the inner periphery thereof.

Turning momentarily to FIG. 2, the strip 16 is illustratively shown within the cell container 10. The trailing portion of the strip 16 which extends to the right from the hole 24 in FIG. 1 may be imagined as the vertically extending portion 30 in FIG. 2. The portion of the strip 16 overlying the hole 24 in FIG. 1 may be seen as the portion 32 extending across the container base in FIG. 2. The portion of the strip 16 extending leftward from the hole 24 in FIG. 1 accordingly corresponds to the vertically extending portion in FIG. 2 adjacent the container periphery and centered 180° around the periphery from the center of the portion 30.

It is easily understood then, that the lower strip 18 will be similarly oriented within the container 10 with its vertically extending portions centered 90° and 270° from the center of the reference portion 30 of strip 16.

Returning to the described process, the mandrel 13 is preferably formed from an elastomeric material such as polyurethane rubber which expands radially when the mandrel 13 is pressed axially into the base of the container. The radial expansion of the mandrel 13 exerts a generally equal force against the vertically extending strip portions, pressing them against the axially extending side walls of the container 10. The force causes the lithium to be cold welded to the container wall, as it is known to do, to provide good electrical contact between the lithium and the container. The mandrel is then withdrawn, leaving the two strips within the container covering essentially all of the container's inner periphery. The lithium functions as an anode when the cell is completely assembled.

As is known in the art, a separator material is employed interjacent the anode and cathode structures of some cells to physically and electrically isolate the electrodes from each other. Naturally, strips of separator material such as fiberglass may be similarly employed in the next stage of assembly.

While the foregoing description will suggest many modifications and variations to those skilled in the art, it should be understood that the invention is not limited to the Preferred embodiment described hereinabove. Various shapes and materials, for example, may be employed without undue experimentation. Accordingly, the invention is to be defined by the appended claims which should be given the broadest scope permitted by the prior art, so as to include those modifications and variations, as well as equivalent processes and apparatus, which are within the spirit of the invention.

Finally, we believe that a cell manufactured in accordance with the foregoing method is novel and, owing to our inability to distinctly describe the resultant cell in any other manner, we shall claim it in terms of its manufacturing process.

We claim:

1. A method for inserting electrode material into the container of an electrochemical cell comprising the steps of:
    forming a strip of electrode material into a generally U-shaped structure;
    inserting the U-shaped structure, base first, into an openended cell so that the leading base contacts the interior end wall of the container;
    pressing the base and interior end wall into contact; and
    spreading the legs of the U-shaped structure into contact with respective adjacent walls of the container interior.

2. The method of claim 1 including the step of passing the generally central segment of the strip through a gap located between a pair of contact surface areas extending away from the gap.

3. The method of claim 2 including the steps of:
    generally aligning the axis of the cell container and the gap center;
    pushing the generally central region of the strip through the gap with a mandrel.

4. The method of claim 3 including the steps of:
    pushing the generally central region of the strip through the gap with a mandrel having an elastomeric head; and
    pressing the strip against the inner base wall of the container with sufficient force to cause radial expansion of the mandrel head, the size of the radially expanded head being sufficient to press the trailing strip legs against the interior container walls.

5. The method of claim 1 including the steps of:
    extending a first strip of electrode material across one end of a through-hole formed in a first member;
    generally co-axially aligning the open end of the cell container with the other end of the through-hole;
    pushing the portion of the strip overlying the hole through the hole and into the container bringing the trailing portions of the strip being thereby pulled through the hole and entering the container generally parallel to the inner container walls; and
    pressing the trailing portions of the strip towards the respective adjacent container wall areas.

6. The method of claim 4 including the steps of:
    axially passing a strip of electrode material against a contacting surface which imparts a generally curved shape to the strip, the curve being generally transverse to the axial direction;
    generally aligning the open end of an open-ended container axially downstream from the contacting surface so that the curved strip enters the container; and
    pressing the curved strip against the interior wall of the container along the length of the strip.

7. The method of claim 6 wherein the strip is pressed against the wall by
    extending an elastomeric mandrel generally axially into the container,
    pressing the mandrel against the base wall of the container so that it expands generally radially to generally uniformly press the electrode material against the container wall.

8. The method of claim 5 including the steps of extending a second strip of electrode material in a generally transverse direction with respect to the first strip so that a portion of the two strips be in an overlap relationship,
    Simultaneously pushing the first and second strip through the hole and into the container so that the respective trailing portions of the strips are circumferentially spaced within the container, and
    pressing the trailing portions towards respective adjacent container wall areas.

9. The method of claim 8 including the step of extending the second strip across a through-hole formed in a second member spaced from the first member and generally co-axial with the hole in the first member.

10. An electrochemical cell formed by the method of claim 9.

11. Apparatus for inserting electrode material into the container of an electrochemical cell comprising:
a first member having a through-hole;
means for supporting a first strip of electrode material in a first direction with an overlying portion across the through-hole;
means for pushing the strip through the hole in a second direction generally perpendicular to said first direction so that the strip enters the container as a generally U-shaped structure with the overlying portion of the strip preceding the strip segments remote from the hole, said pushing means being a mandril sized to pass through said through-hole, and positioned generally concentrically with said through-hole so that the supported strip lies therebetween, said mandril being operable in said second direction to push the strip through said through-hole and into the container, the leading portion of the mandril being formed from an elastomeric material and including:
means for sufficiently pressing the mandril against the interior base of the cell to cause expansion of the elastomeric material,
the dimension of the expanded elastomeric material being such that the electrode material interjacent the mandril and container wall is pressed into contact with the wall;
means for so operating the mandril;
means for supporting a container to receive the electrode material subsequent to its passing through the hole.

12. The apparatus of claim 11 including means for positioning the container adjacent the end of the hole, which is remote from the strip.

13. The apparatus of claim 11 including guide means for defining a strip-receiving path across the first member and adapted to position the strip in a first direction across the hole,
a pair of reference means positioned on or adjacent the path with the hole generally centrally located therebetween, the reference means being separated by a distance bearing a relationship to the dimensions of the container to define a pair of reference positions.

14. The apparatus of claim 13 wherein the separation distance is substantially equivalent to $2H+0$ where $H+0$ are the height and diameter of the container, respectively.

15. The apparatus of claim 13 wherein the guide means is formed by a channel formed in the strip-supporting surface of the first member.

16. The apparatus of claim 13 including cutting means positioned in the path at one reference position to sever the strip thereat.

17. The apparatus of claim 16 wherein the cutting means is a bed blade lies across the path.

18. Apparatus for inserting electrode material into a container of an electrochemical cell comprising:
a first member having a through-hole;
means for supporting a first strip of electrode material in a first direction with an overlying portion of the material across the through-hole;
means for pushing the strip through said through-hole in a second direction so that the strip can enter the container as a generally U-shaped structure with the overlying portion of the strip preceding the strip segments remote from the hole, said second direction being generally perpendicular to said first direction;
means for supporting a second strip of electrode material in a third direction, generally transverse to said first and second directions, said means for supporting a second strip of electrode material being a second member having a through-hole and including a supporting surface for supporting the second strip with its generally central region overlying the second through-hole, said second member being positioned so that the first and second through-holes are generally aligned so that said second strip can be pushed by said pushing means through said second through-hole generally simultaneously with the first strip.
means for supporting a container to receive the electrode material subsequent to its passing through the hole.

* * * * *